United States Patent
Gonzalez et al.

(10) Patent No.: US 11,513,494 B2
(45) Date of Patent: Nov. 29, 2022

(54) INSPECTING MESH MODELS

(71) Applicant: HEWLETT-PACKARD DEVELOPMENT COMPANY, L.P., Spring, TX (US)

(72) Inventors: Sergio Gonzalez, Sant Cugat del Valles (ES); Jordi Roca, Sant Cugat del Valles (ES); Matthew A. Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 330 days.

(21) Appl. No.: 16/647,127

(22) PCT Filed: Dec. 4, 2017

(86) PCT No.: PCT/US2017/064447
§ 371 (c)(1),
(2) Date: Mar. 13, 2020

(87) PCT Pub. No.: WO2019/112546
PCT Pub. Date: Jun. 13, 2019

(65) Prior Publication Data
US 2021/0124333 A1  Apr. 29, 2021

(51) Int. Cl.
*G05B 19/4099* (2006.01)
*B33Y 50/00* (2015.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
CPC ...... G05B 19/4099; G05B 2219/49023; B33Y 50/00; B29C 64/386; G06F 30/20; G06F 2113/10
See application file for complete search history.

(56) References Cited

U.S. PATENT DOCUMENTS 8,175,734 B2   5/2012   Fogel
9,751,294 B2   9/2017   Smith
(Continued)

FOREIGN PATENT DOCUMENTS

CN   105427360   3/2016
EP   2923287    9/2015
(Continued)

OTHER PUBLICATIONS

Popa T, Julius D, Sheffer A. Material-aware mesh deformations. InIEEE International Conference on Shape Modeling and Applications 2006 (SMI'06) Jun. 14, 2006 (pp. 22-22). IEEE. (Year: 2006).*

(Continued)

*Primary Examiner* — Chuen-Meei Gan
(74) *Attorney, Agent, or Firm* — HP Inc. Patent Department

(57) ABSTRACT

In an example, a method includes receiving, at least one processor, a mesh model for an object, a first transformation matrix to apply to the mesh model to describe a first object for generation in additive manufacturing and a second transformation matrix to apply to the mesh model to describe a second object for generation in additive manufacturing. The method may further include determining, by at least one processor, if the first and second transformation matrices describe transformations which are equivalent in (Continued)

terms of mesh errors and, if so, inspecting the mesh model for mesh errors once for both the first and second transformation matrices.

15 Claims, 3 Drawing Sheets

(51) Int. Cl.
    *B29C 64/386*     (2017.01)
    *G06F 30/20*     (2020.01)
    *G06F 113/10*     (2020.01)

(52) U.S. Cl.
    CPC .... *G06F 30/20* (2020.01); *G05B 2219/49023* (2013.01); *G06F 2113/10* (2020.01)

(56) References Cited

U.S. PATENT DOCUMENTS

| | | | |
|---|---|---|---|
| 2009/0138231 A1 | 5/2009 | Little | |
| 2011/0087350 A1* | 4/2011 | Fogel | G06T 19/00 700/98 |
| 2015/0005919 A1 | 1/2015 | McGatha | |
| 2015/0379769 A1 | 12/2015 | Luo | |
| 2016/0107388 A1 | 4/2016 | Chopra | |
| 2016/0321384 A1 | 11/2016 | Deepankar | |
| 2016/0332388 A1 | 11/2016 | Park | |
| 2017/0113414 A1 | 4/2017 | Zeng | |
| 2018/0095450 A1* | 4/2018 | Lappas | B33Y 10/00 |
| 2020/0307174 A1* | 10/2020 | Woytowitz | B33Y 50/02 |

FOREIGN PATENT DOCUMENTS

| | | |
|---|---|---|
| WO | WO-2013113372 A1 | 8/2013 |
| WO | WO-2017196343 | 11/2017 |

OTHER PUBLICATIONS

Check 3D Models for Errors before 3D Printing in 3DS Max. (Cont. from above) <http://makeitcg.com/3d-printing-error-check-3ds-max/2739/>.

* cited by examiner

INSPECTING MESH MODELS

BACKGROUND

Additive manufacturing processes, or three-dimensional (3D) printing, are processes in which three-dimensional objects may be formed, for example, by the selective solidification of successive layers of a build material. The object to be formed may be described in a data model. Selective solidification may be achieved, for example, by thermal fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed, and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of at least one three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a detailing agent, which acts to modify the effects of a fusing agent or energy applied for example by inhibiting, reducing or increasing coalescence or to assist in producing a particular finish or appearance to an object. A property modification agent, for example comprising a dye, colorant, a conductive agent, an agent to provide transparency or elasticity or the like, may in some examples be used as a fusing agent or a modifying agent, and/or as a print agent to provide a particular property for the object.

Additive manufacturing systems may generate objects based on structural design data. This may involve a designer generating a three-dimensional model of at least one object to be generated, for example using a computer aided design (CAD) application. The model may define the solid portions of the object(s). To generate three-dimensional object(s) from the model using an additive manufacturing system, the model data can be processed to generate slices of parallel planes of the model. Each slice may define a portion of a respective layer of build material that is to be solidified or caused to coalesce by the additive manufacturing system.

Figure 1:
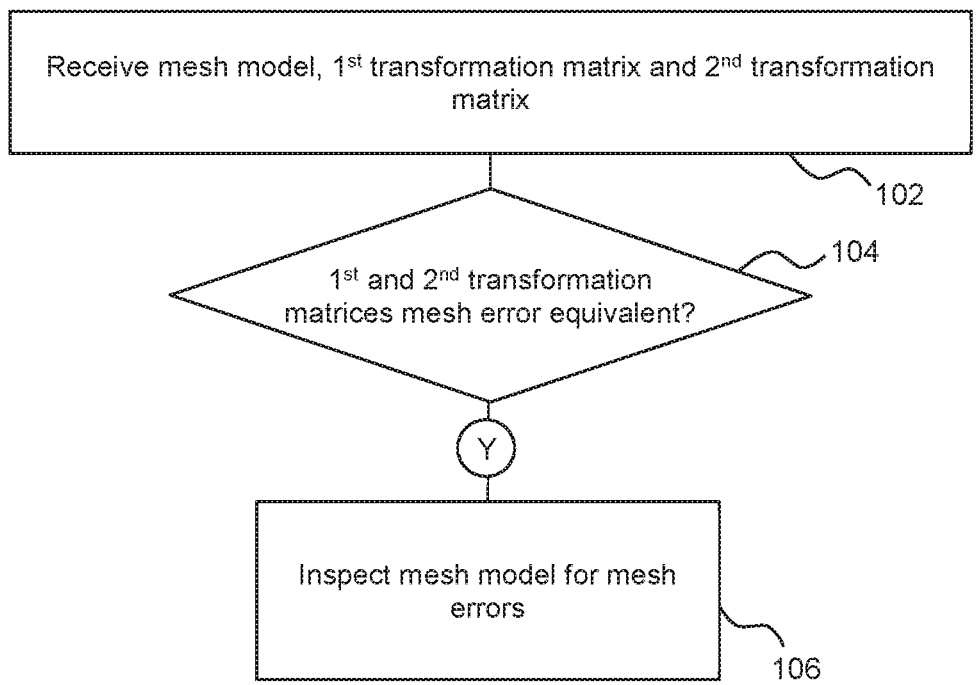
FIG. 1 is an example of a method for inspecting mesh models.

FIG. 1 shows an example of a method which may be a computer implemented method, for example carried out using at least one processor, and/or may comprise a method of inspecting mesh models.

Block 102 comprises receiving, at at least one processor, (i) a mesh model for an object to be generated in additive manufacturing, (ii) a first transformation matrix to apply to the mesh model to describe a first object for generation in additive manufacturing, and (iii) a second transformation matrix to apply to the mesh model to describe a second object for generation in additive manufacturing.

The mesh model represents an object as a plurality of polygons. For example, the mesh model may represent the object (including the interior), and/or the surface(s) of the object, as a plurality of polygons. The polygons may be of a common type, for example comprising triangles. The object model data may for example be generated by a computer aided design (CAD) application. In one example, the mesh model may be specified in terms of the vertices of the polygons (by which edges joining the vertices and polygons enclosed by the edges may be defined).

In one example, the polygon mesh is a triangular mesh representing a surface of the object and each triangle in the mesh has three vertices each defined by their xyz coordinates v0, v1 and v2 (the location of the polygon vertices in 3D space). While the example of a triangle has been used here, the mesh may be based on a different polygon or polygons, which may in some examples be curved (rather than flat or planar) polygons. In some examples, the mesh is a manifold closed surface mesh. In some examples, the model may be provided as a '3MF' format file. A 3MF file may contain one or a plurality of models (triangular meshes), and each model may be referenced by at least one transformation matrix.

The transformations may comprise any or any combination of: a scaling transformation, a rotational transformation, a translational transformation, a symmetrical transformation. For example, an object may be defined in terms of its vertices as set out above. These vertices may be specified relative to an origin and a translation may be used to place the virtual object at an intended location, orientation and scale in a virtual build volume. A plurality of objects may be generated in a single build volume in some examples. In some examples, such a 'batch' of objects may comprise more than one instance of the same underlying object model. In some examples a single virtual object described by a mesh model may have different transformation matrices applied thereto. Examples of transformations include translations (for example, so that the objects) each occupy a unique volume within the virtual build volume, or variations on the virtual object such as reflections, symmetrically equivalent objects, or scaled versions of the virtual object. In some examples, a transformation may comprise a rotation, which may be applied to achieve a greater packing density of virtual objects within the virtual build volume.

Therefore, in some examples, the first and second transformation matrices may be applied to a common mesh model to result in the generation of two separate objects which may vary from one another in terms of any, or any combination, of: position, orientation, scale, symmetry, or the like. The transformation matrices may locate each mesh model within a virtual build volume. By providing multiple transformations, multiple objects may be generated based on a single received object model.

In some examples, the at least one processor in block 102 may receive data providing a full specification of the intended content of a virtual build volume, which may describe a plurality of objects having intended relative locations. The data may be made up of at least one mesh model and a plurality of transformation matrices. In some examples, the data may be parsed and each mesh model may be stored in an intermediate file and may be associated with at least one transformation matrix. In other words, all transformation matrices which are associated with a particular mesh model may be stored with an association to that mesh model.

Block 104 comprises determining, by at least one processor, if the first and second transformation matrices describe transformations which are equivalent in terms of mesh errors. If so, the method proceeds to block 106 which comprises inspecting the mesh model for mesh errors once for both the first and second transformation matrices. In some examples, if however the determination in block 104 is that the first and second transformation matrices are not equivalent in terms of mesh errors, the method may proceed by determining if the mesh model is associated with mesh errors when either of the first and second transformation matrices is applied. In other words, an inspection of the mesh model and/or the transformation matrices may be carried out to determine if there are mesh errors with each of the first and second transformation matrices applied in separate inspections. In some examples, determining the at the mesh models are not equivalent in terms of mesh errors may in itself indicate a mesh error, for example in the case that the determinants of the transformation matrices have different signs, as is described in greater detail below.

Mesh models for an object may be inspected prior to 3D printing/object generation to determine whether they contain at least one mesh error, which in some examples may comprise determining if a model comprises a mesh error which would result in an object generation error. Such errors may for example comprise any or any combination of an isolated polygon or vertex, an empty or negative mesh volume, a hole in the mesh (the mesh is not 'watertight', which may mean detecting holes of at least a threshold size as smaller holes may 'close up' on object generation), inconsistent polygon orientation, overlapping polygons, duplicated polygons or vertices, zero area polygons, non-manifold vertices or edges, and mesh intersections. Such errors are often difficult to identify by eye.

For example, the 3MF specification defines a series of rules, some of which are categorized as MUST rules (i.e., rules that have to be complied with) and others which are categorized as SHOULD rules (i.e. recommendations which should be followed but which it is possible a 3D print/object generation apparatus can nevertheless handle properly). However, other specifications may specify different rules, or may specify rules in a different manner. For example, a set of MUST rules may comprise any or any combination of:

MUST-1: Every triangle edge in the mesh shares common vertex endpoints with the edge of exactly one other triangle (Manifold Edge rule). An inspection in relation to this rule may comprise traversing all the polygon edges and counting the number of edges which are not shared by more than one polygon (boundary edges). If any of these values is greater than 0, this rule may be considered violated.

MUST-2: Every pair of adjacent polygons within the mesh has the same orientation of the face normal toward the exterior of the mesh, meaning that the order of declaration of the vertices on the shared edge will be in the opposite order. A triangle face normal (for triangle ABC, in that order) may be defined in a consistent manner, for example as a unit vector in the direction of the vector cross product $(B-A) \times (C-A)$ (Consistent Polygon Orientation rule). An inspection in relation to this rule may comprise counting the number of 'flips' or reversals of normal orientation between neighbor triangles. If the resulting value is greater than zero, this rule may be considered violated (i.e. no normal flip is allowed between adjacent triangles).

MUST-3: All polygons to be oriented with normals that point away from the interior of the object. Meshes with negative volume will not be generated (or will become voids), in accordance with the positive fill rule (Outward-facing Normal rule). An inspection in relation to this rule may comprise computing a volume of the mesh (for example as described in Alyassin A. M. et al., *Evaluation of new algorithms for the interactive measurement of surface area and volume*, Med Phys 21(6), 1994). If the value is negative, this rule may be considered violated.

It may be noted that the above MUST rules, in combination, result in a mesh which is a continuous surface without holes (or no holes above a threshold size), gaps, open edges, or non-orientable surfaces (therefore, for example, a Klein bottle would violate the MUST rules).

In some examples, a set of SHOULD rules may comprise any or any combination of the following:

SHOULD-1: Self-intersections or overlapping objects should be minimized or avoided (Minimal Self-Intersection rule). An inspection in relation to this rule may comprise considering all the polygons from the mesh. In an example, for every polygon, a bounding box containing the polygon is computed, and all the polygons which are contained or intersect with this bounding box are selected. Then, the selected polygons are tested for intersection with the polygon under test, for example as described in Möller, T., *A fast triangle-triangle intersection test*. Journal of Graphics Tools, 2(2), 1997.

SHOULD-2: All polygons should have a non-zero area (Non-Zero Area Polygon/Non-Degeneracy rule). An inspection in relation to this rule may comprise computing the area of every polygon and if it zero, this rule may be considered violated.

In the case of SHOULD-1, the presence of self-intersections or overlapping objects may however be treated as filled with a positive fill rule (which may or may not be what the user intended). In the case of SHOULD-2, it is possible that the mesh may be correctly interpreted. However, a zero area polygon could result in numerical instabilities while calculating a polygon normal.

While a particular set of rules and inspections has been detailed above, the set of rules and/or inspections may vary. In addition, inspections may be carried out concurrently (for example to fully utilize data derived during any iteration through the polygons of the model), or in any order.

By determining, in block 104, if the first and second transformation matrices describe transformations which are equivalent in terms of mesh errors, the number of inspections, or validation operations, may be reduced by considering transformations which may produce different mesh errors separately, and not repeatedly considering transformations which produce the same mesh errors. As the number of transformations associated with a particular model increase, so do the potential computing resources which can be saved by such a method.

For example, input data may comprise a pair of data sets: a mesh model and a set of transformation matrices. Mesh errors may be equivalent for some categories of transformations. For example, where a mesh model is associated with a plurality of translations, the transformed mesh models may be considered to be mesh-error equivalent, and the mesh model may be inspected once. On the other hand, the same model with different transformations like a symmetrical transformation may be determined to be non-equivalent as, while one version of the mesh model may be error free, another transformation may exhibit an in-out boundary flip which results in a violation of the 'MUST-2' rule above, as one of the meshes will have a negative volume. A scaling transformation may increase the distance of near edges resulting in a hole appearing that would not be apparent in a smaller version of the mesh model. Therefore, scaling transformations may be non-mesh error equivalent.

In the case of the validation of the 3MF core specification, all transformations will be equivalent unless they change the orientation of the triangle normals (i.e. change the sign of the volume). In the case that the same mesh model is referenced from a transformation which changes the orientation of the triangle normals, and another one which does not, a mesh error may be determined without needing to evaluate the mesh. To consider this in a little more detail, if the determinant of the transformation matrix is negative, this means that it inverts the order of the vertices of the triangle and thus the orientation of the triangle normal. This in turn means that if the model is referenced from a transform with a positive determinant and a transform with a negative determinant, one of the resulting meshes after applying the respective transformation matrices will end with a negative volume, which is a violation of the MUST-3 rule. In some examples, therefore, the determination of mesh errors may be an inspection of the set of transformation matrices, and the inspections may comprise inspecting the first transformation matrix to determine the sign of its determinant, and inspecting the second transformation matrix to determine the sign of its determinant, and determining if there is a difference.

In some examples, the inspection may be applied to the transformed mesh. In the case of meshes which are associated with transformations which are mesh error equivalent, the transformed mesh to be inspected may be selected, for example in the order the files are provided (which may for example be specified in a standard file format), randomly, or in some other way. As the transformed meshes are equivalent, it may be expected that testing any of them would produce the same results.

Based on the results of these inspections, an overall outcome may be produced. In some examples, the inspections may be carried out directly or implicitly for all virtual objects within a virtual fabrication chamber, i.e. for a set of objects which it is intended should be generated (i.e. built or printed) in a single manufacturing operation.

Examples of outcomes may be as follows:

ERROR: The errors detected on the input model are not printable/realisable at all. For example, such an outcome may be generated in the event that a MUST rule is violated.

WARNING: There have been some errors detected in at least one mesh model, but it may be that this can be fixed or ignored without a high impact on the generated object quality. For example, such an outcome may be generated in the event that a SHOULD rule is violated.

SUCCEED_WITH_SMALL_FEATURES: The model has no errors, or the detected errors can be fixed without impacting part quality. For example, the model includes small features (e.g. holes) which will be lost during the object generation process.

SUCCEED: The tested mesh model(s) has/have no errors, or the detected errors can be fixed without impacting object quality. Such an outcome may be indicative that no rules have been broken.

This set of outcomes is provided purely by way of example. In some examples, different outcomes may result, for example detailing the error detected.

Figure 2:
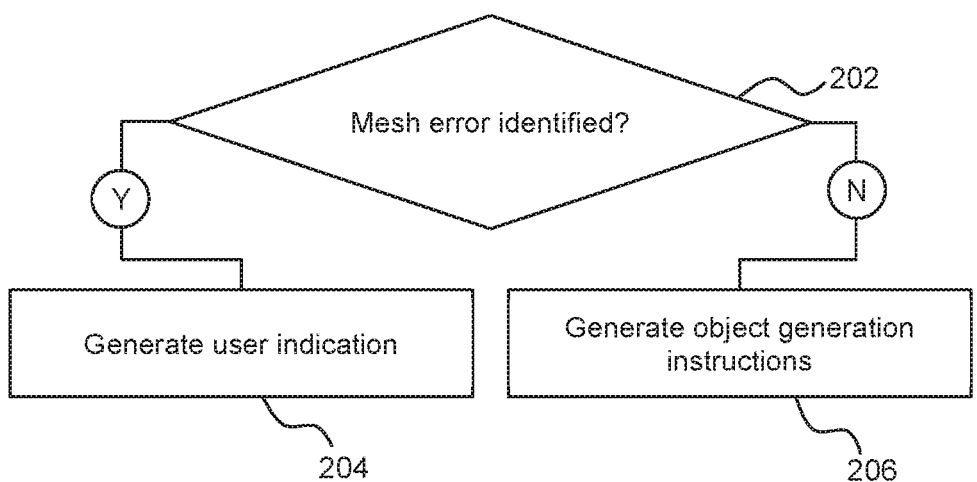
FIG. 2 is an example of a method for generating a user indication or object generation instructions.

FIG. 2 shows an example of a method which may follow the method of FIG. 1, for example following block 106, or, if it is determined that the mesh model is associated with transformation matrices which are not mesh error equivalent, FIG. 2 may follow an inspection for mesh errors when both of the first and second transformation matrices is applied. Block 202 comprises determining if inspecting the mesh model (which may be a transformed mesh model) and/or set of transformation matrices has identified a mesh error.

If so, the method comprises, in block 204, generating a user indication, for example an error message or the like. In some examples, the object application process may stop at this point. In other examples, a user may be permitted to remove any virtual object which is associated with mesh error(s) from the virtual build volume, and to proceed with fabrication without that virtual object. In another example, a user may be instructed to fix the mesh model, and/or an automatic fix of the mesh model may be attempted. In still further examples, the user may be permitted to proceed with fabricating the object at their own risk (this may for example be the case in the event of a SHOULD rule being violated rather than a MUST rule). Combinations of these actions may be permitted in some examples. The action taken may depend on the nature of the error detected.

If no mesh errors are detected, in block 206, the method proceeds by generating object generation instructions.

In some examples, such instructions may be generated on a slice by slice basis. A slice of a virtual build volume may be one 'voxel' thick. In some examples of additive manufacturing, three-dimensional space may be characterised in terms of such voxels, i.e. three-dimensional pixels, wherein each voxel occupies or represents a discrete volume. In some examples, the voxels are determined bearing in mind the print resolution of an object generation apparatus, such that each voxel represents a volume which may be uniquely addressed when applying print agents, and therefore the properties of one voxel may vary from those of neighbouring voxels. In other words, a voxel may correspond to a volume which can be individually addressed by an object generation apparatus (which may be a particular object generation apparatus, or a class of object generation apparatus, or the like) such that the properties thereof can be determined at least substantially independently of the properties of other voxels. For example, the 'height' of a voxel may correspond to the height of a layer of build material. In some examples, the resolution of an object generation apparatus may exceed the resolution of a voxel. In general, the voxels of an object model may each have the same shape (for example, cuboid or tetrahedral), but they may in principle differ in shape and/or size. In some examples, voxels are cuboids, for example cubes based on the height of a layer of build material. In some examples, in processing data representing an object, each voxel may be associated with properties, and/or then to object generation instructions, which apply to the voxel as a whole.

The instructions may for example specify a choice and/or amount of print agent to apply to each print addressable location in order to generate a physical representation of at least one slice of the virtual build volume, which may comprise one or a plurality of object portions.

Although in FIG. 2, the generation of object generation instructions follows a determination that there are no errors, in other examples, object generation instructions may be generated following detection of errors as outlined above, for example following a user indication that at least one object may be removed from the build volume and/or that the risk of an object generation error is accepted by the user.

In some examples, the method may further comprise generating at least one object.

Figure 3:
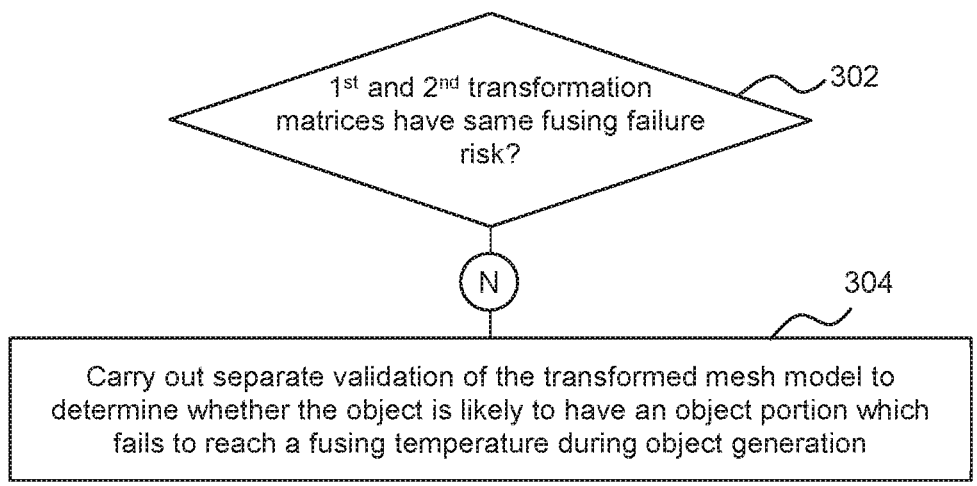
FIG. 3 is another example of a method for inspecting mesh models.

FIG. 3 is an example of a method, which, in some examples, may be used in conjunction (for example, in parallel, or before or after) with the methods of FIGS. 1 and 2.

Block 302 comprises determining if the first and second transformation matrices describe transformations which are equivalent in terms of a risk that a portion of the object has a predicted object generation temperature which is below a fusing temperature of build material to be used in object generation. This may be the case for certain object features which may be relatively small, or relatively small within a layer.

There may be a minimum feature size which can be generated by an apparatus, for example a finite resolution in relation to the accuracy with which build material and/or print agents may be placed. Some techniques allow for accurate placement of print agent on a build material, for example by using print heads operated according to inkjet principles of two dimensional printing to apply print agents, which in some examples may be controlled to apply print agents with a resolution of around 600 dpi. This theoretically means that features as small as 42 microns could be generated. However, when energy is applied (for example using heat lamps) to cause the build materials to fuse, such small areas of agent-treated build material may not absorb enough energy to reach the fusing temperature of the build material. Thus, in practise, in some examples, the minimum realisable feature size may be determined not by the resolution of the object generation apparatus but by the temperature that such a feature can reach during the fusing process.

Thus, in some examples, the first and second transformation matrices may be considered in terms of whether they change the analysis as to whether a feature is likely to fail to reach a fusing temperature (for example, because they describe a scaling transformation). If the first and second transformation matrices are non-equivalent in this way, in block 304, separate validations of the transformed mesh model are carried out to determine whether the object is likely to have an object portion which fails to reach a fusing temperature during object generation. If however they are determined to be equivalent, then a single validation may be carried out in relation to the determination as to whether a feature is likely to fail to reach a fusing temperature.

In other object generation techniques, such as when using a chemical binder, there may be other size limitations, such as the resolution with which binding material may be applied. In such examples, the first and second transformation matrices may be considered in terms of whether they change the analysis as to whether a feature is within an achievable resolution of the apparatus.

In some examples, the methods of FIGS. 1, 2 and/or 3 may be carried out using processing circuitry provided on an additive manufacturing apparatus. This may allow the error checking to be smoothly integrated into an object generation pipeline. Outcomes such as those described above could be presented to a user at the point of object generation, allowing an object generation process to be aborted or modified in the event that errors are likely to be seen, thus saving print resources, and/or processing resources in determining object generation instructions.

Figure 4:
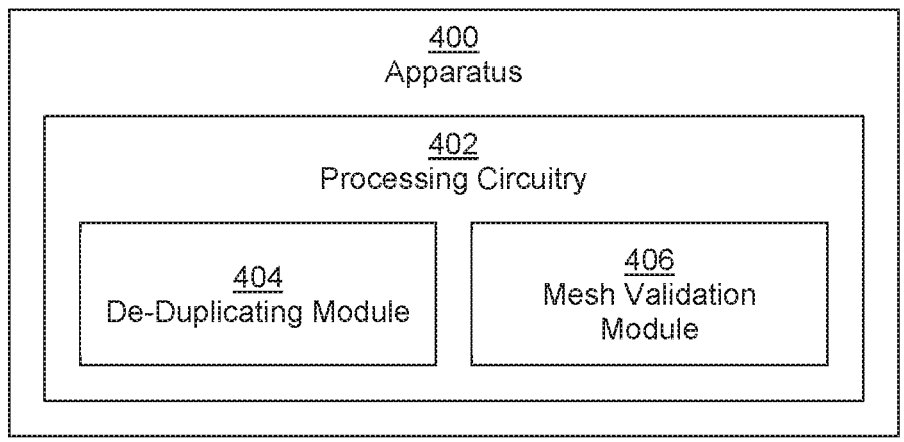
FIGS. 4 and 5 are examples of apparatus for additive manufacturing processes.

FIG. 4 shows an example of apparatus 400 comprising processing circuitry 402. The processing circuitry 402 comprises a de-duplicating module 404 and a mesh validation module 406.

In use of the apparatus 400, the de-duplicating module 404 analyses data indicative of the content of a virtual build volume describing a plurality of objects to be generated in a common object generation operation, the data comprising mesh models associated with transformations, and to determine if any of the objects to be generated share a mesh model and are associated with transformations which are equivalent in terms of mesh errors.

In use of the apparatus 400, the mesh validation module 406 inspects mesh models, wherein mesh models for objects which share a mesh model and which are associated with transformations which are equivalent in terms of mesh errors are inspected in a single validation operation. In some examples, mesh models for other objects are validated in separate validation operations. In some examples, validation operations for mesh models which are associated with transformations which are not equivalent in terms of mesh errors may be based on the set of transformations to be applied to a particular mesh model (for example, if the set comprises transformation having determinants of different signs, as set out above).

The processing circuitry 402 may, for example, carry out any of the methods of FIGS. 1 to 3 described above.

Figure 5:
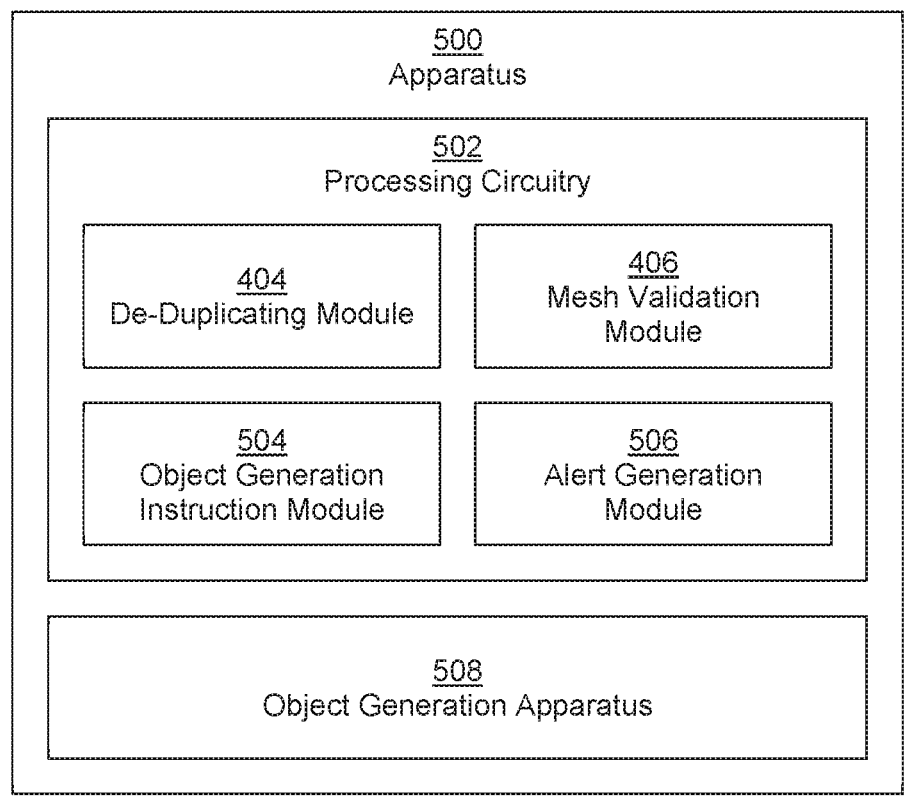

FIG. 5 shows another example of an apparatus 500 comprising processing circuitry 502, the processing circuitry 502 comprising the de-duplicating module 404 and the mesh validation module 406 as described in relation to FIG. 4.

In addition, the processing circuitry 502 of FIG. 5 comprises an object generation instruction module 504 which, in use of the apparatus 500, generates object generation instructions if at least a portion of the content of the virtual build volume is successfully validated. In some examples, the object generation instruction module 504 is to generate object generation instructions when the whole content of the virtual build volume is successfully validated, and not if just a portion thereof is successfully validated. The object generation instructions may be, in some examples, derived in a layer by layer manner, as has been described above. The object generation instruction module 504 may, in some examples, generate control data for generating an object based on the representation of the object as a plurality of discrete voxels. For example, properties associated with voxels may map, via a look-up table or the like to a print agent or print agent combination to apply to a location corresponding to the voxel. In some examples, a halftoning process may be used to determine where print agent drops may be applied within that location.

The processing circuitry 502 further comprises an alert generation module 506 which, in use of the apparatus 500, generates an alert when at least one transformed mesh model is not successfully validated. This alert may comprise a user instruction or user indication, for example a message displayed on a screen, an audio signal, or some other alert.

The apparatus 500 further comprises object generation apparatus 508 which, in use of the apparatus 500, generates a plurality of objects in a common build volume. The object generation apparatus 508 may generate objects in a layer-wise manner by selectively solidifying portions of layers of build materials. The selective solidification may in some examples be achieved by selectively applying print agents, for example through use of 'inkjet' liquid distribution technologies, and applying energy, for example heat, to each layer. The object generation apparatus 508 may comprise additional components not shown herein, for example a fabrication chamber, a print bed, print head(s) for distributing print agents, a build material distribution system for providing layers of build material, energy sources such as heat lamps and the like, which are not described in detail herein.

In some examples, the apparatus 400, 500 may carry out at least one block of FIG. 1, 2 or 3.

Figure 6:
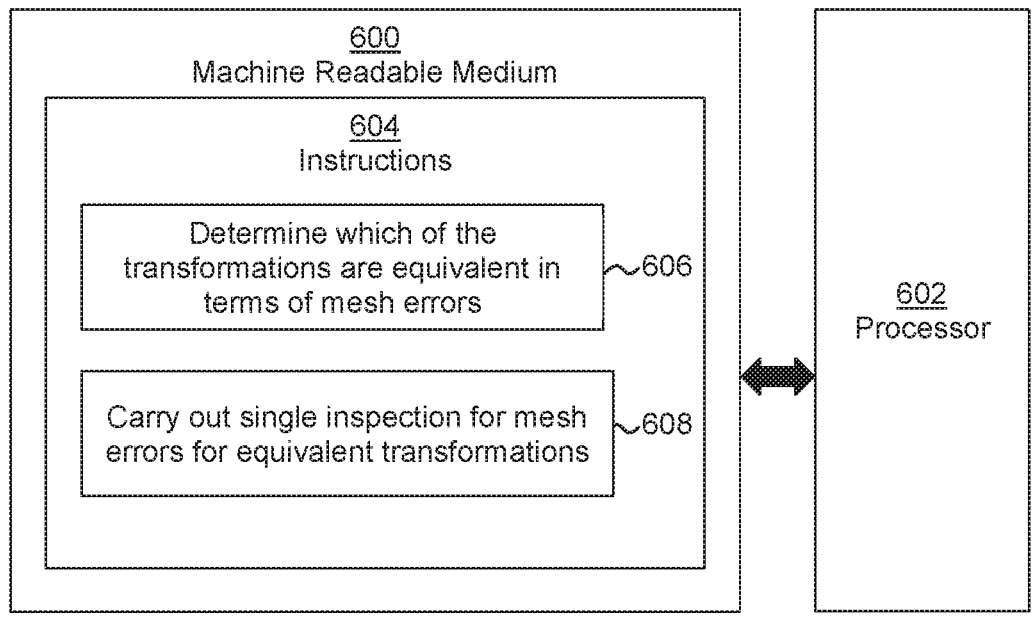
FIG. 6 is an example of a machine readable medium in association with a processor.

FIG. 6 is an example of a tangible, non-transitory, machine readable medium 600 in association with a processor 602. The machine readable medium 600 stores instructions 604 which may be non-transitory and which, when executed by the processor 602, cause the processor 602 to carry out processes. The instructions 604 comprise instructions 606 to, for a mesh model associated with each of a plurality of transformations, determine which of the transformations are equivalent in terms of mesh errors, and instructions 608 to carry out a single inspection for mesh errors for a set of two or more equivalent transformations. In some examples, the method may comprise determining if the mesh model is associated with mesh errors when any of the transformation matrices is applied for the non-equivalent transformations, which may comprise inspecting the transformation matrices and/or the transformed mesh models.

In some examples, the instructions 604 may comprise instructions to cause the processor 602 to carry out the single validation or inspection for a transformed mesh model.

In some examples, the instructions 604 may comprise instructions to cause the processor 602 to carry out at least one block of FIG. 1, 2 or 3, and/or may provide at least one module of the processing circuitry 402, 502.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the de-duplicating module 404, mesh validation module 406, object generation instruction module 504 and/or alert generation module 506) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    receiving, at least one processor:
        a mesh model for an object;
        a first transformation matrix to be applied to the mesh model to describe a first version of the object to generate via additive manufacturing;
        a second transformation matrix, different than the first transformation matrix, to be applied to the mesh model to describe a second version of the object to generate via additive manufacturing, wherein the first and second versions of the object differ in any or any combination of position, orientation, scale, and symmetry;
    determining, by the at least one processor, that the first and second transformation matrices describe transformations that are mesh-error equivalent in that the transformations described by the first and second transformation matrices include translation transformations that produce a same type of errors in the first and second versions of the object when applied to the mesh model;

in response to determining that the transformations described by the first and second transformation matrices are mesh-error equivalent, inspecting, by the at least one processor, the mesh model for mesh errors just once for both the first and second transformation matrices, as opposed to a first time for the first transformation matrix and a second time for the second transformation matrix; and in response to the mesh model having no mesh errors, having user-accepted mesh errors, or having no mesh errors preventing generation of the first and second versions of the object via additive manufacturing, physical building the object via additive manufacturing as either one or both of the first and second versions of the object.

2. The method of claim 1, wherein inspecting the mesh model for the mesh errors comprises determining whether the mesh model comprises any mesh errors that would result in an object generation error.

3. The method of claim 1, further comprising validating the mesh model by determining whether the mesh model comprises one or multiple of any of the following:

an isolated polygon or vertex;

an empty mesh volume;

a negative mesh volume;

a hole;

inconsistent polygon orientations;

overlapping polygons;

duplicated polygons or vertices;

zero area polygons;

non-manifold vertices or edges; and mesh intersections.

4. The method of claim 1, further comprising in response to the mesh model having no mesh errors, generating, by the at least one processor, object generation instructions by which the first and second versions of the object can be generated.

5. The method of claim 1, in response to the mesh model having one or multiple mesh errors, generating a user indication of the mesh errors of the mesh model.

6. The method of claim 1, wherein the first and second transformation matrices place the mesh model within a virtual build volume via the first and second versions, respectively.

7. The method of claim 1, wherein the first and second transformation matrices describe any or any combination of a scaling transformation, a rotational transformation, a translational transformation, and a symmetrical transformation.

8. The method of claim 1, wherein determining that the transformations described by the first and second transformation matrices are mesh-error equivalent comprises determining that the transformations described by the first and second transformation matrices are equivalent in terms of a risk that a portion of the object has a predicted object generation temperature below a fusing temperature of build material to be used in generating the first and second versions of the object, respectively.

9. An apparatus comprising:

a processor; and a memory storing instructions executable by the processor to:

analyze data indicative of a virtual build volume describing a plurality of versions of an object to be generated via additive manufacturing, to determine that transformations applied to a mesh model to respectively describe the versions of the object are mesh-error equivalent in that the transformations include translation transformations that produce a same type of errors in the versions of the object when applied to the mesh model;

in response to determining that the transformations are mesh-error equivalent, inspect the mesh model for mesh errors just once for all the transformations, as opposed to individually for each transformation; and in response to the mesh model having no mesh errors, having user-accepted mesh errors, or having no mesh errors preventing generation of the versions of the object via additive manufacturing, physically building the object via additive manufacturing as any version of the object, wherein the versions of the object differ in any or any combination of position, orientation, scale, and symmetry.

10. The apparatus of claim 9, wherein the instructions are executable by the processor to further generate object generation instructions by which the versions of the object can be generated.

11. The apparatus of claim 10, wherein the instructions are executable by the processor to validate the mesh model by determining whether the mesh model comprises one or multiple of any of specified polygons, vertices, volumes, holes, orientations, edges, and intersections.

12. The apparatus of claim 9, in which the instructions are executable by the processor to, in response to the mesh model having one or multiple mesh errors, generate an alert as to the mesh errors of the mesh model.

13. The apparatus of claim 9, wherein the transformations describe any or any combination of a scaling transformation, a rotational transformation, a translational transformation, and a symmetrical transformation.

14. A non-transitory machine readable medium comprising instructions that, when executed by a processor, cause the processor to:

for a mesh model associated with each of a plurality of transformations, determine that the transformations are mesh-error equivalent in terms of mesh errors in that the transformations include translation transformations that produce a same type of errors in respective versions of the object when applied to the mesh model;

in response to determining that the transformations are mesh-error equivalent, inspect the mesh model just once for all the transformations, as opposed to individually for each transformation; and in response to the mesh model having no mesh errors, having user-accepted mesh errors, or having no mesh errors preventing generation of the versions of the object via additive manufacturing, physically building the object via additive manufacturing as any version of the object, wherein the respective versions of the object differ in any or any combination of position, orientation, scale, and symmetry.

15. The non-transitory machine readable medium of claim 14, wherein the instructions, when executed by the processor, cause the processor to further generate object generation instructions by which the respective versions of the object can be generated.

* * * * *